US008828541B2

(12) United States Patent
Bettiol et al.

(10) Patent No.: US 8,828,541 B2
(45) Date of Patent: Sep. 9, 2014

(54) TITANIUM DIOXIDE DOPED WITH FLUORINE AND PROCESS FOR THE PRODUCTION THEREOF

(75) Inventors: Mauro Bettiol, Giavera del Montello (IT); Fabio Bassetto, Monticello Conte Otto (IT)

(73) Assignee: Breton SpA, Castello di Godego (TV) (IT)

( * ) Notice: Subject to any disclaimer, the term of this patent is extended or adjusted under 35 U.S.C. 154(b) by 0 days.

(21) Appl. No.: 13/814,347

(22) PCT Filed: Jul. 21, 2011

(86) PCT No.: PCT/IB2011/053260
§ 371 (c)(1),
(2), (4) Date: Feb. 5, 2013

(87) PCT Pub. No.: WO2012/017347
PCT Pub. Date: Sep. 2, 2012

(65) Prior Publication Data
US 2013/0130036 A1    May 23, 2013

(30) Foreign Application Priority Data

Aug. 6, 2010 (IT) .............................. TV2010A0114

(51) Int. Cl.
*B32B 5/16* (2006.01)
(52) U.S. Cl.
USPC .......................................... 428/402; 977/811
(58) Field of Classification Search
USPC .......................................... 428/402; 977/811
See application file for complete search history.

(56) References Cited

U.S. PATENT DOCUMENTS

| | | | | |
|---|---|---|---|---|
| 5,091,252 A | * | 2/1992 | Hruska et al. | .................. 428/357 |
| 5,597,515 A | * | 1/1997 | Kauffman et al. | ........ 252/519.12 |
| 7,661,542 B2 | * | 2/2010 | Baurmeister et al. | .... 210/500.39 |
| 7,713,899 B2 | * | 5/2010 | Hampden-Smith et al. | .. 502/101 |
| 2008/0248356 A1 | | 10/2008 | Kimura et al. | |

FOREIGN PATENT DOCUMENTS

| | | |
|---|---|---|
| WO | 2005090235 A2 | 9/2005 |
| WO | 2006077203 A1 | 7/2006 |
| WO | WO2006/077203 * | 7/2006 |
| WO | 2007092097 A2 | 8/2007 |
| WO | 2007092097 A3 | 8/2007 |
| WO | 2009113045 A2 | 9/2009 |
| WO | 2009113045 A3 | 9/2009 |

OTHER PUBLICATIONS

Li D et al: "Fluorine-doped TiO2 powders . . . " Journal of Fluorine Chemistry, Elsevier, NL vol. 126, No. 1, Jan. 1, 2005, pp. 69-77.*

Li D. et al., "Fluorine-doped Ti02 powders prepared by spray pyrolysis and their improved photocatalytic activity for decomposition of gas-phase acetaldehyde," Journal of Fluorine Chemistry, Elsevier, NL., vol. 126, No. 1, Jan. 1, 2005, pp. 69-77.
Lee M-W et al., "Highly visible photocatalytic activity of fluorine and nitrogen co-doped nanocrystalline anatase phase titanium oxide converted from ammonium oxotrifluorotitanate," IEEE Transactions on Nanotechnology, IIII Service Center, Piscataway, NJ, US, vol. 6, No. 3, May 1, 2007, pp. 316-319.
Todorova N et al., "Structure tailoring of fluorine-doped Ti0-2 nanostructured powders," Materials Science and Engineering B., Elsevier Sequoia, Lausanne, CH, vol. 152, No. 1-3, Aug. 25, 2008, pp. 50-54.
Czoska, A.M. et al., "The nature of defects in fluorine doped Ti02," Journal of Physical Chemistry, vol. 112, May 27, 2008, pp. 8951-8956.
"International Search Report dated Oct. 24, 2011 for PCT/IB2011/053260, from which the instant application is based," 4 pgs.
"Search Report and Written Opinion dated Feb. 24, 2011 for related application IT TV20100114, including English translation," (9 pgs.).
Hsieh, C-T et al., "Fabrication and superhydrophobicity of fluorinated titanium dioxide nanocoatings," Journal of Colloid and Interface Science, vol. 340, Aug. 1, 2009, pp. 237-242.
"International Search Report dated Oct. 27, 2011 for related International Application No. PCT/IB2011/053261," 3 pgs.
"Search Report and Written Opinion dated Mar. 28, 2011 for related application IT TV201000115, including English translation," 8 pgs.
Di Noto, V. et al., "Hybrid inorganic-organic proton conducting membranes based on Nafion and t wt% of MxOy (M—Ti, Zr, Hf, Ta and W). Part II: Relaxation phenomena and conductivity mechanism," Journal of Power Sources, 187 (2009) 57-66.
Spiegel, Designing & Building Fuel Cells, 2007, 346-348.
Liao, Chun-Jen et al., "Fabrication of porous biodegradable polymer scaffolds using a solvent merging/particulate leaching method," Porous Biodegradable Polymer Scaffolds (2001), 676-681.
Cappadonia, M. et al., "Fuel Cells," Ullmann's Encyclopedia of Industrial Chemistry (2005), 1-23.
Chen, Li-Chun et al., "Nafion/PTFE and zirconium phosphate modified Nafion/PTFE composite membranes for direct methanol fuel cells," Journal of Membrane Science 307 (3008), 10-20.
Grot, Flurinated Ionomers, 2008, 113-116.
Di Noto, V. et al., "New inorganic-organic proton conducting membranes based on Nafion and [ZrO2] (SiO2)0.67] nanoparticles: Synthesis vibrational stuside and conductivity," Journal of Power Sources 178 (2008), 561-574.
Vigouroux, Rolando, Pyrolysis of Biomass, Dissertation, 2001, Abstract and p. 11, Royal Institute of Technology, Stockholm.
Di Noto, V. et al., "Hybrid inorganic-organic nanocomposite polymer electrolytes based on Nafion and fluorinated TiO2 for PEMFCs," International Journal of Hydrogen Energy 37 (2012) 6169-6181.

* cited by examiner

*Primary Examiner* — Leszek Kiliman
(74) *Attorney, Agent, or Firm* — Fredrikson & Byron, P.A.

(57) ABSTRACT

A crystalline titanium dioxide containing fluorine atoms within the crystal lattice comprising atoms of titanium and oxygen is described; this titanium dioxide is particularly suitable for the production of solid-state electrolytes, hybrid membranes for fuel cells or electrolysers. A process for producing the aforesaid titanium dioxide is also described.

24 Claims, 11 Drawing Sheets

HR-TEM image

Detail of the HR-TEM image, showing the interplanar distances of the nanocrystals of anatase in FT, equal to 2.4 Å.

Figure 8
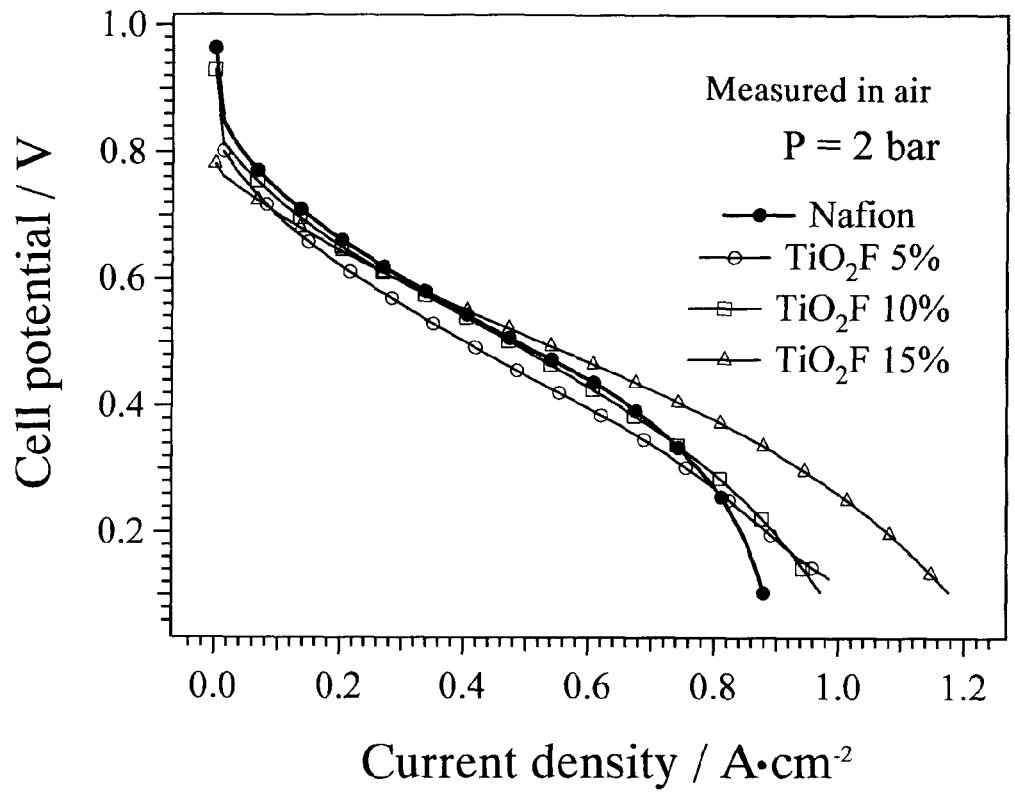
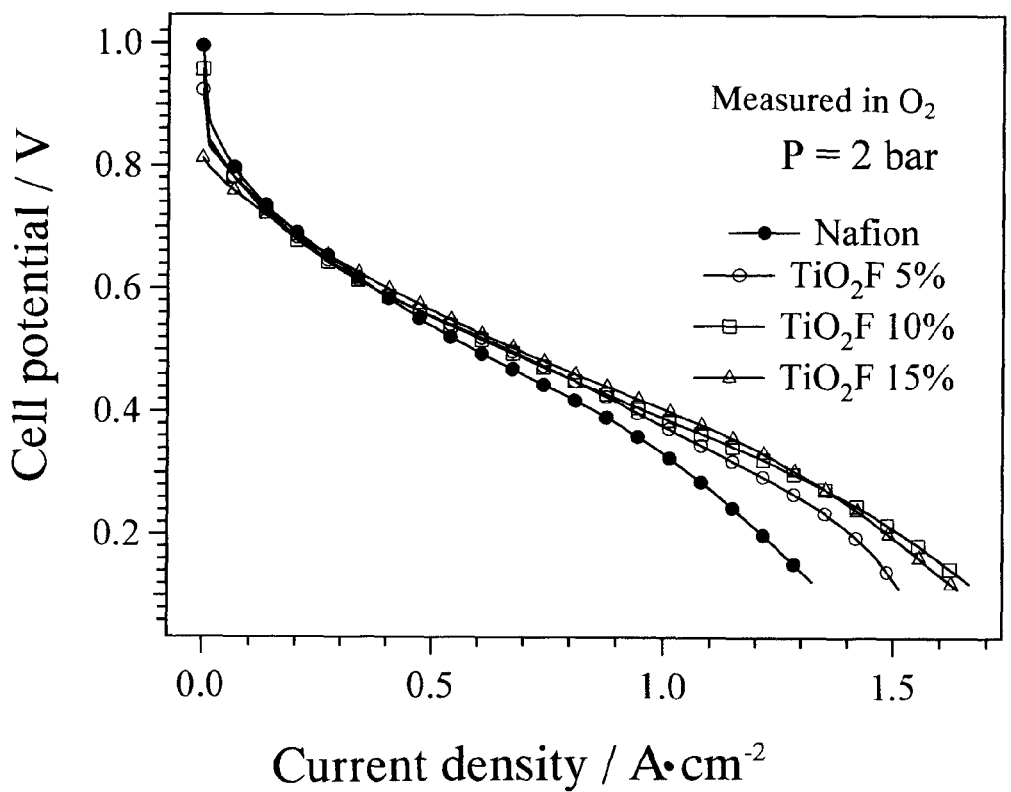

Figure 9
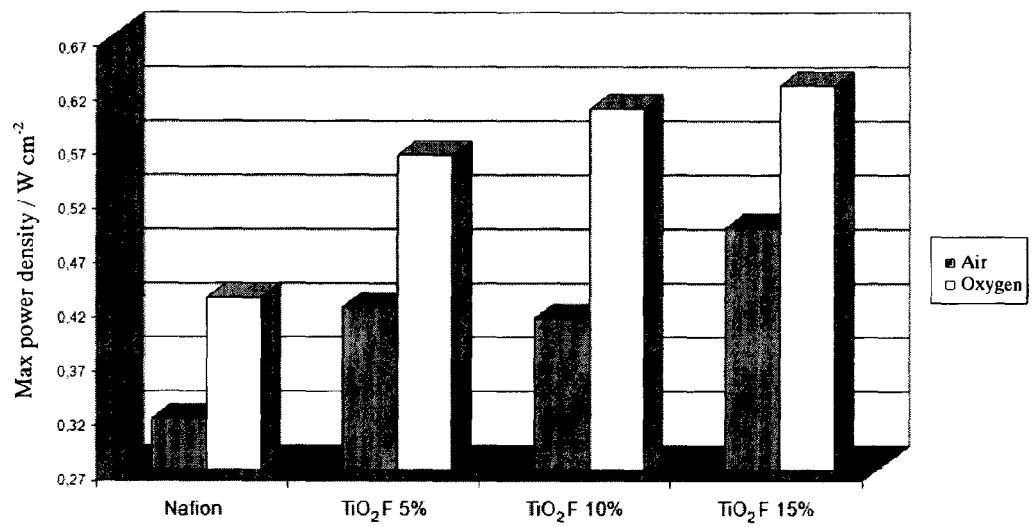
Figura 10
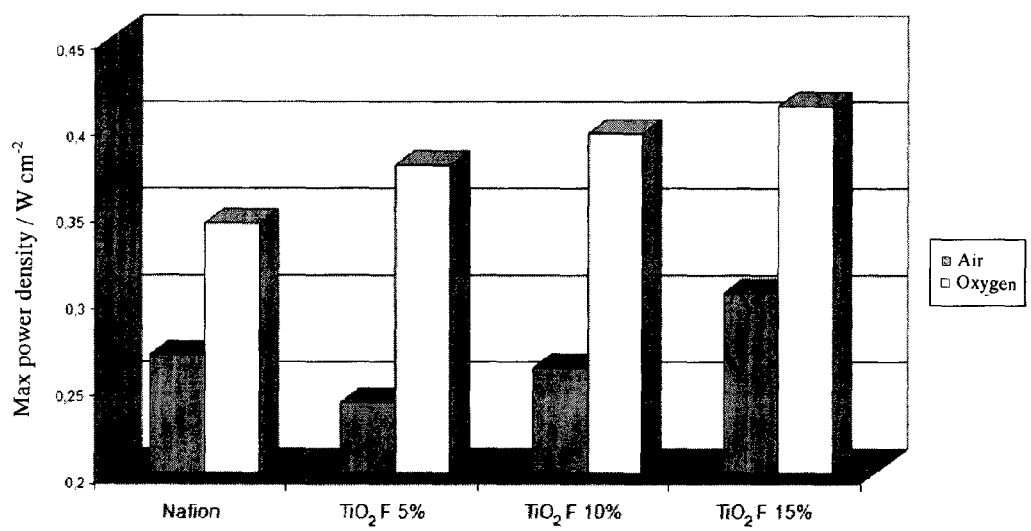

Figure 12
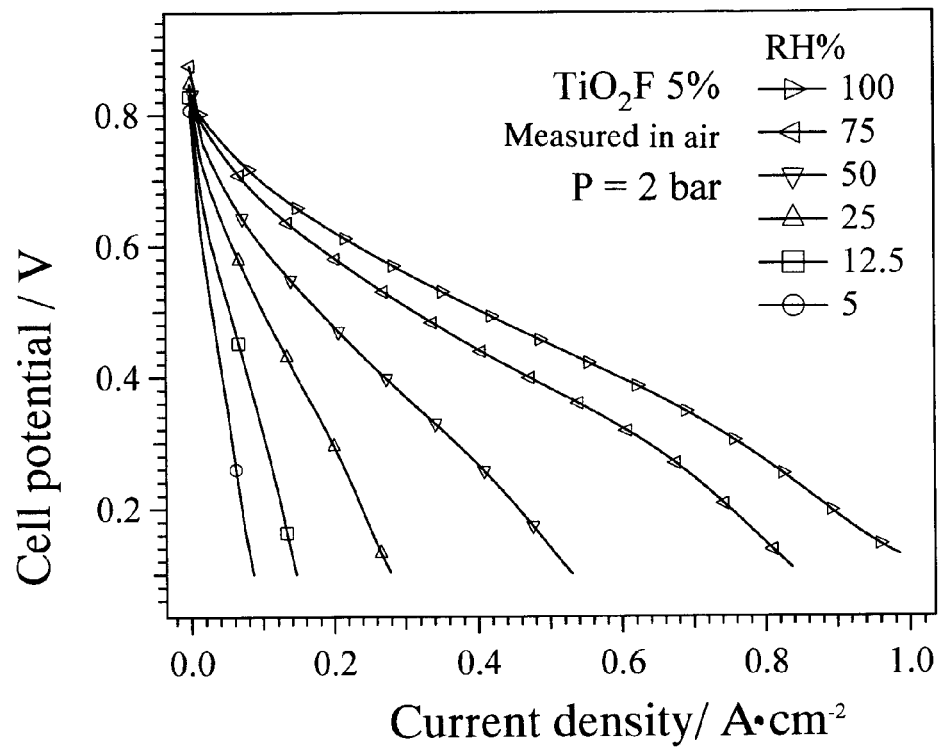
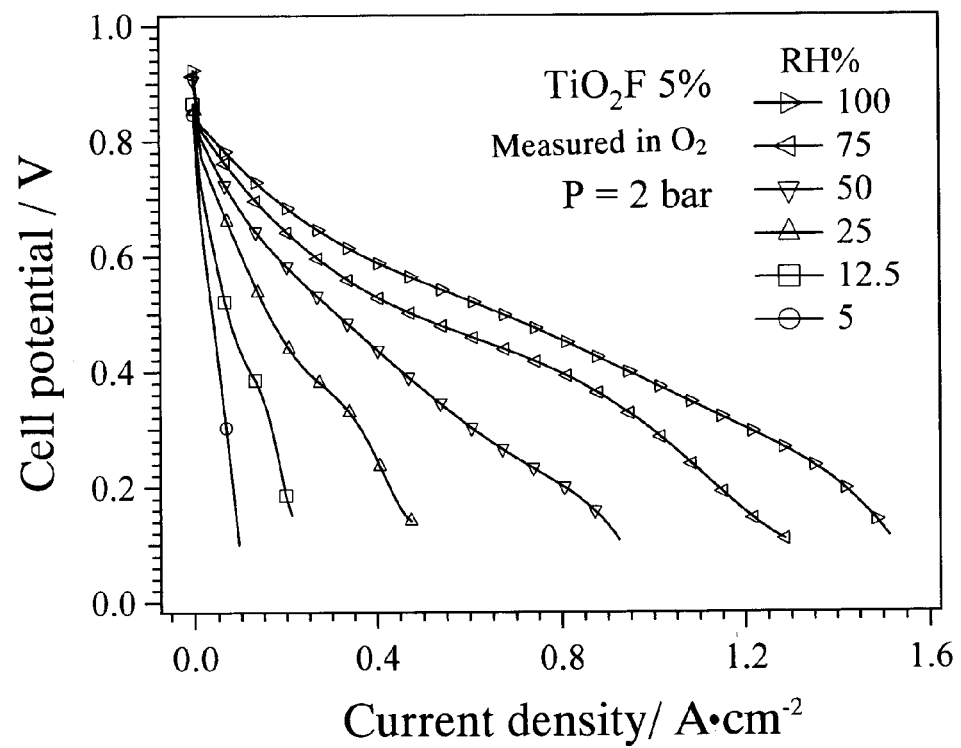

Figure 14
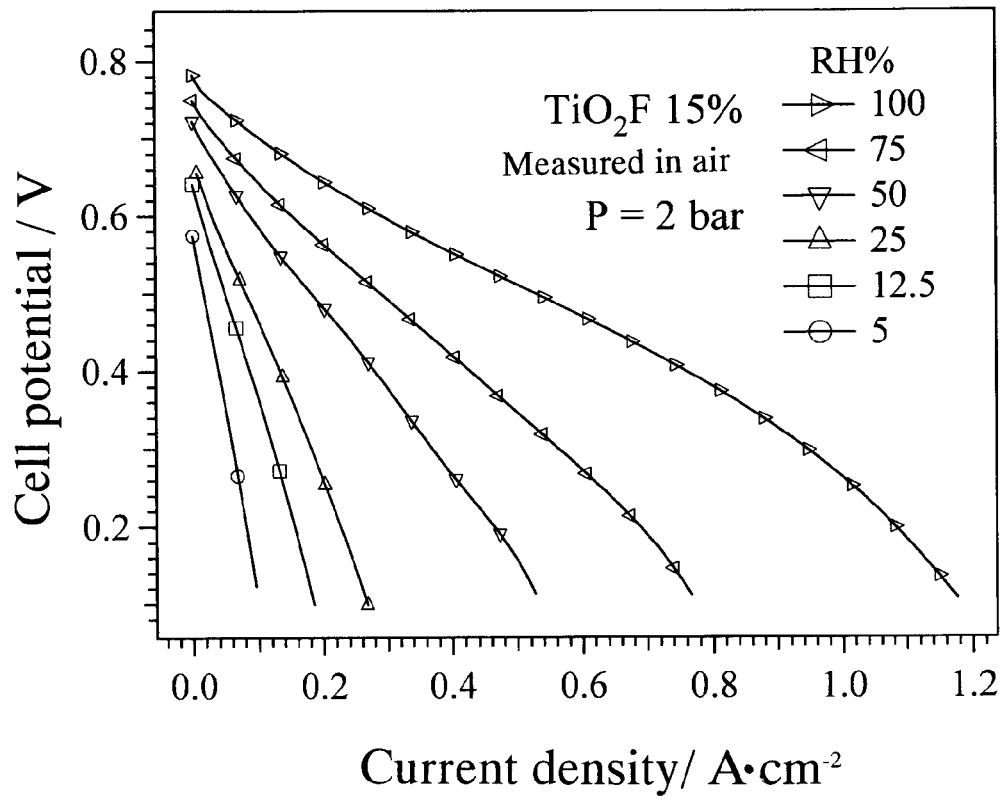
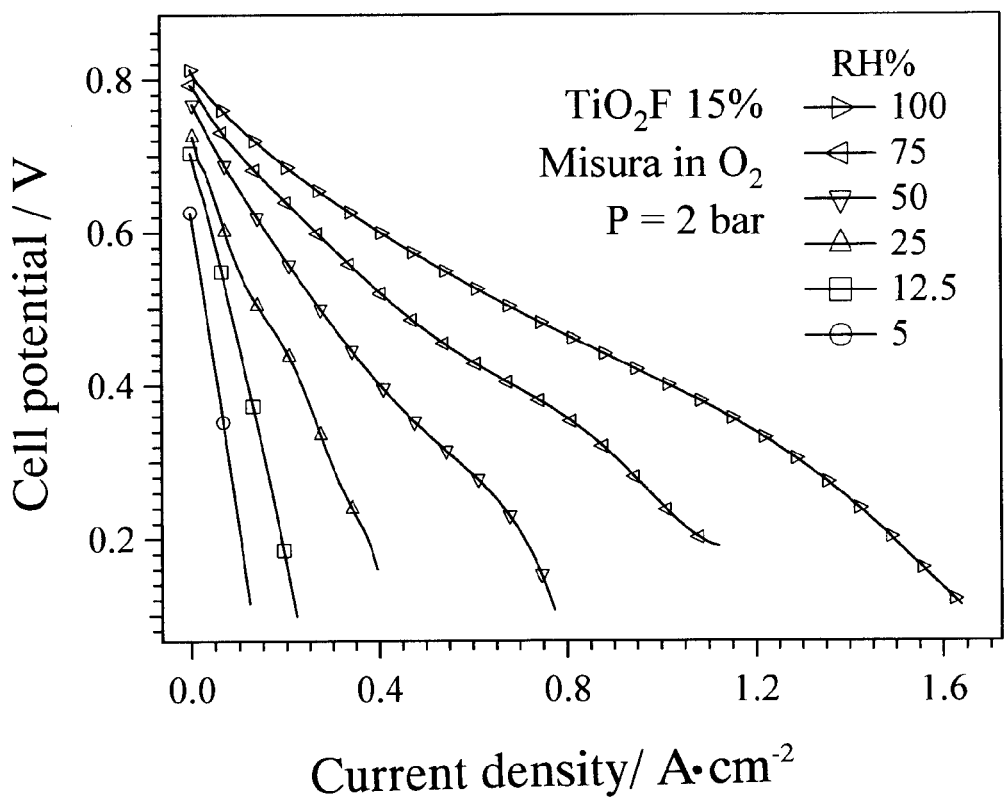

TITANIUM DIOXIDE DOPED WITH FLUORINE AND PROCESS FOR THE PRODUCTION THEREOF

RELATED APPLICATIONS

This application is a 35 U.S.C. 371 national stage filing from International Application No. PCT/IB2011/053260 filed Jul. 21, 2011 and claims priority to Italian Application No. TV2010A000114 filed Aug. 6, 2010, the teachings of which are incorporated herein by reference.

The invention relates to fluorine-doped titanium dioxide ($TiO_2$); this titanium dioxide may advantageously be used in the manufacture of inorganic/organic hybrid membranes. The resulting membranes are characterised by better proton conductivity and mechanical properties than those demonstrated by similar systems which do not include doped titanium dioxide. Furthermore the proton conductivity and the performance of some resulting inorganic/organic hybrid membranes in PEMFC fuel cells are less compromised by dehydration than similar systems which do not include doped titanium dioxide. It may also be used in the production of solid-state electrolytes.

STATE OF THE ART

A fuel cell is a device which converts the chemical energy of the reagents fed to it directly into electrical energy. Fuel cells are well known in the art and are for example described in Cappadonia et al., Ullmann's Encyclopedia of Industrial Chemistry, *Fuel Cells,* 2005, 1-23, Wiley-VCH, which is included here for reference.

Given that a fuel cell is an electrochemical device and not a heat engine, it can easily achieve very high efficiencies, even more than twice those characteristic of conventional combustion engines. There are many different families of fuel cells distinguished by the materials from which they are made and the temperature at which they operate in optimum mode. One of the most intensively studied families is the one including polymer electrolyte fuel cells (Proton Exchange Membrane Fuel Cells, PEMFC). PEMFC operate at low temperature (T<130° C.) and comprise a polymer membrane capable of conducting protons (Proton Exchange Membrane, PEM) separating two porous electrodes through which reagents and reaction products can diffuse (Gas Diffusion Layers, GDL). These are covered with a layer of electrocatalyst material used to promote the electrochemical reactions involved in the functioning of the device. PEMFC are silent devices with no moving parts, of simple construction, that are capable of achieving high efficiencies (even over 55%) and are characterised by high energy and power densities. Also, PEMFC do not produce fine powders or pollutants such as sulphur or nitrogen oxides ($SO_x$ and $NO_x$) and, if fed with pure hydrogen, the only product of their operation is water. All these characteristics make PEMFC particularly suitable devices for providing power for vehicles or portable electronic devices such as multimedia readers, portable computers and other devices, without causing any harm to the environment.

The core of every PEMFC is the proton conducting membrane, through which protons obtained at the anode following oxidation of the fuel can be transported to the cathode where they are recombined with the products of the reduction reaction of the oxidising agent. The latter generally comprises oxygen present in the air. The most widely used materials in manufacturing proton exchange membranes are perfluorinated copolymers such as Nafion™, Hyflon-Ion, Dow polymer and others. All these materials comprise a main perfluorinated polymer chain, similar to that of Teflon™, from which there extend perfluoroether side chains terminating in an —$SO_3H$ group characterised by high acidity. These materials are capable of conducting protons in that, as soon as water is present, there is a marked phase separation into domains of different polarity. The domains having the highest polarity include water, which is made strongly acid by the —$SO_3H$ groups delimiting the domains. These high polarity domains are immersed in a low polarity matrix comprising the main perfluorinated chains and the perfluoroether side chains. Proton conduction occurs when different polar domains come into contact following fluctuations in the low polarity matrix. When this happens, there is long range migration of protons from one high polarity domain to the other in the form of $H_3O^+$ ions. The perfluorinated copolymers described above characteristically have high proton conductivity and excellent chemical stability. On the other hand they are extremely expensive and only perform their function if they are suitably hydrated. Finally, perfluorinated copolymers do not always succeed in preventing the reagents from permeating from one electrode to another. The microscopic dynamics of the low and high polarity domains present in the perfluorinated copolymers are intimately associated. One consequence of this fact is that the maximum temperature at which a perfluorinated copolymer can operate efficiently is approximately 80-90° C.; above this there are transitions which change the microscopic structure of the material, causing it to dehydrate easily with a consequent fall in proton conductivity. One of the most important aims of research in the field of proton exchange membranes for use in PEMFC includes the use of non-humidified gaseous reagents at an operating temperature of at least 120-130° C. Under these conditions it is possible to design smaller and more compact PEMFC systems that are also capable of using, as a fuel, "dirty" hydrogen obtained from the processes of the steam reforming of hydrocarbons. Other families of proton conduction materials have also been conceived, these including polyethersulphone sulphonates, polyetherketone sulphonates, sulphonated silicones and others. Although in many respects better than perfluorinated copolymers, none of these materials are at present able to fully express their potential and still require appreciable research efforts.

One of the strategies for obtaining proton conduction membranes having better performance characteristics than that provided by the systems nowadays available is that of developing inorganic/organic hybrid membranes. These membranes comprise a material capable of conducting protons, such as for example Nafion, in which nanometric inorganic powders, such as oxides and phosphonates acting as fillers which may have been given surface functionality, are dispersed. The resulting inorganic/organic hybrid materials may be characterised by better mechanical properties than the proton-conducting starting material; their proton conductivity may be better and be less influenced by the level of hydration under which they operate.

Proton-conducting inorganic/organic hybrid membranes are well known in the art and are described for example in the following articles: Di Noto et al., *Journal of Power Sources,* 178 (2008) 561-574; Di Noto et al., *Journal of Power Sources,* 187 (2009) 57-66; Chen et al., *Journal of Membrane Science,* 307 (2008) 10-20; all of which are incorporated for reference.

Fuel cells containing ion-exchange membranes are also described in U.S. Pat. No. 7,713,899, U.S. Pat. No. 7,661,542 and US2008/0248356, all of which are included here for reference. Another family of devices of great technological interest based on functional elements quite similar to those described above for applications in PEMFC is that of PEM electrolysers (Proton Exchange Membrane electrolysers). A PEM electrolyser is essentially a PEM fuel cell which acts conversely by converting the electrical power and the water fed to it into hydrogen and oxygen having a high degree of purity (in excess of 99.9%) through an electrolysis process. PEM electrolysers are used to produce pure gases only when they are needed for a particular application, thus avoiding the need to store them in heavy bulky cylinders subject to strict safety standards for high-pressure highly flammable gases. The core of a PEM electrolyser comprises the same proton exchange membrane as is used in a PEMFC; the material used to make the membrane must have optimum proton conductivity and high chemical and electrochemical stability.

PEM electrolysers are well known in the art and are for example described in Spiegel, *Designing & Building Fuel Cells*, 2007, 346-348, McGraw-Hill and in Grot, *Fluorinated Ionomers*, 2008, 113-116, William Andrew Inc., all of which are included here for reference.

WO2005/090235 and WO2006/077203 describe the production of undoped titanium dioxide. Fluorine-doped titanium dioxide is described in: Li et al., *Journal of Fluorine Chemistry*, Elsevier, vol. 126, n. 1, 69-77, 2005; Todorova et al. *Material Science and Engineering*, Elsevier, vol. 152, n. 1-3, 50-54, 2008; Czoska et al. *Journal of Physical Chemistry*, vol. 112, 8951-8956, 2008; U.S. Pat. No. 5,597,515; WO 2009/113045.

DESCRIPTION OF THE INVENTION

It has now been surprisingly found that an inorganic/organic hybrid membrane containing fluorine-doped $TiO_2$ according to this invention has better ion conductivity and mechanical properties than the inorganic/organic hybrid membranes known in the art.

Membranes containing fluorine-doped $TiO_2$, which form the subject matter of this invention, can conduct protons but can also conduct ions other than protons (for example $NR_4^+$, where R is a $C_1$-$C_6$ alkyl radical, such as for example methyl or ethyl).

Also the proton conductivity and performance of inorganic/organic hybrid membranes containing such fluorine-doped $TiO_2$ in PEMFC fuel cells are less compromised by dehydration than similar systems which do not contain fluorine-doped $TiO_2$.

In addition, use of the aforesaid membranes in the production of PEM electrolysers provides these electrolysers with a longer service life.

Finally, fluorine-doped $TiO_2$ may be functionalised with fused alkali metals or alkaline earth metals (for example Li or Na). The surface of the material obtained is functionalised with ions of the abovementioned metal and can be used to produce a solid-state electrolyte for ion batteries. In particular, through thermogravimetric analyses these new electrolytes show stability up to 250° C. suggesting for example that they may be used in high temperature lithium batteries, with all the advantages associated with increased conductivity.

The present invention therefore relates to fluorine-doped $TiO_2$ and the corresponding process for its preparation.

For the purposes of the present invention the term fluorine-doped $TiO_2$ means particles of said crystalline metal oxide having an average particle size of less than 500 nm, preferably between 10 and 500 nm, containing fluorine, hydroxy groups, ammonium cations and nitrogen oxides. In particular the terms fluorine-doped $TiO_2$ particles, fluorine-doped titanium dioxide particles or FT mean particles of anatase having an average particle size of less than 500 nm, preferably between 10 and 500 nm, even more preferably between 50 and 300 nm, which have fluorine, hydroxy groups, ammonium cations and nitrogen oxides on their surface.

More particularly said particles are of the "shell-core" type, that is they are formed of an internal core essentially comprising crystalline titanium dioxide, preferably anatase, and a surface coating having a mean thickness of between 0.3 and 20 nm, preferably between 0.6 and 10 nm. The surface coating contains fluorine atoms bridging with titanium atoms and terminal fluorine atoms; it is also rich in hydroxy groups, ammonium cations and nitrogen oxides located on the surface of the coating.

According to one of the aspects of the invention, the process for the production of fluorine-doped $TiO_2$ comprises the following stages:

(a) a titanium ore, preferably containing iron, is reacted with a $NH_4HF_2$ aqueous solution;

(b) the aqueous dispersion thus obtained is filtered with subsequent separation of a solid residue and an aqueous solution containing titanium salts;

(c) the aqueous solution so obtained is subjected to hydrolysis, said hydrolysis comprising a first stage at pH 6.5-8.0 and a second stage at pH 9.0-11.0;

(d) the aqueous dispersion thus obtained is filtered and the solid residue is subjected to pyrohydrolysis at a maximum temperature of approximately 500° C., preferably approximately 450° C.;

(e) optionally the filtrate obtained from stage (d) is heated to a temperature of 150-170° C., preferably approximately 160° C., and kept at this temperature for a period of 0.5 to 2 hours, with the consequent production of $NH_4HF_2$, which once re-dissolved in water can be recycled to stage (a).

This process includes the extraction of titanium from the ilmenite ore ($FeTiO_3$), which may possibly be enriched; this extraction takes place within a suitable reactor, causing the ore to react with a concentrated aqueous solution of between 10% and 37% by weight and preferably approximately 30% by weight of $NH_4HF_2$ having a pH preferably between 5.5 and 5.7. Chemical analysis of the ilmenite performed using ICP-AES before the start of the reaction with $NH_4HF_2$ has shown that the ore contains traces (<1% by weight) of Al, Ca, Co, Ni and Zn. 1.1% by weight of W is also present.

The ore is added to the reactor preferably with an average particle size of 0.05-1.5 mm, even more preferably approximately 0.2 mm, and may be preheated to 80-120° C., preferably to approximately 100° C. It suggested that the ore should be added to the base of the reactor by means of a system which prevents the gases present within the reactor from rising up the inlet pipe for the sand. The aqueous solution of $NH_4HF_2$ is preferably preheated to 50-100° C., preferably to approximately 80° C.; the ratio by weight between the ilmenite and the $NH_4HF_2$ solution (preferably 30% by weight) is normally between 1:6 and 1:8, and is preferably approximately 1:7.5.

The reactor has equipment to stir the ilmenite sand in such a way as to encourage intimate contact between the reagents (ilmenite and solution), in particular at the bottom of the reactor. The stirring is possibly such as not to create turbulent motion in the top of the reactor; in the best embodiment the stirring speed should not exceed 20 rpm, preferably 10 rpm.

The temperature within the reactor is kept at 100-110° C., preferably 104-106° C., and even more preferably approximately 105° C., at a pressure of between approximately 1 and 2 bar; this may be achieved using the conventional means known in the art, for example a heating jacket system on the outside of the reactor; in the best embodiment the greatest quantity of heat is transmitted through the bottom of the reactor, where the concentration of reagents is highest; also, in order to prevent the escape of gaseous compounds into the outside environment, it is recommended that a leaktight reactor should be used. The reaction has a preferred duration of 40 to 80 minutes.

The pH within the reactor under these operating conditions is approximately 6.5-7.0.

Gaseous ammonia is produced by the reaction; this can be conveyed outside the reactor and absorbed in water to obtain a concentrated solution (approximately 24% by weight) of ammonium hydroxide $NH_4OH$, which can in turn be used during the subsequent stages of hydrolysis of the titanium salts. Removal of the ammonia also makes it possible to control the pressure within the reactor (normally approximately 1 bar).

The reaction between $FeTiO_3$ and $NH_4HF_2$ (in aqueous solution) produces two salts: ammonium hexafluorotitanate $(NH_4)_2TiF_6$ and ammonium (ferric) hexachloroferrate $(NH_4)_3FeF_6$. The titanium salt has a solubility which depends directly on temperature and is inversely dependent on the concentration of $NH_4HF_2$; it therefore remains in solution under the reaction conditions. The iron salt instead has negligible solubility and remains in the form of a solid dispersion. An aqueous solution of $NH_4HF_2$ and $(NH_4)_2TiF_6$ containing the dispersed $(NH_4)_3FeF_6$ salt is recovered from the reactor. The dispersion leaving the reactor is made to pass through a filter capable of retaining solid particles having dimensions between 0.1 and 2.0 μm; this result can be achieved using meshes having holes of 2-3 nm, preferably approximately 2.5 nm. In this section the solid dispersion of the iron salt is separated from the solution of titanium salt.

The filtered sludge may be further washed with $NH_4F$ and/or $NH_4HF_2$ solutions and then filtered a second time; these two filtrations may take place within the same filtering equipment.

After filtering the following is obtained:

(a) a solid sludge portion containing the iron salt $(NH_4)_3FeF_6$;

(b) an aqueous solution containing the titanium salt $(NH_4)_2TiF_6$, ammonium difluoride $(NH_4HF_2)$ and traces of the iron salt $(NH_4)_3FeF_6$, which is a contaminant for the final product.

The solid sludge portion (a) normally has a moisture content of between 10 and 20% by weight depending upon the filtering equipment used. The aqueous solution (b) normally has an iron salt $(NH_4)_3FeF_6$ content of approximately 0.04-0.06% by weight.

The aqueous solution (b) from the filtration stage is then further purified from the iron salt $(NH_4)_3FeF_6$ in order to reduce its concentration to less than 0.01% by weight, preferably less than 0.001% (understood as the concentration of the iron salt), which is equivalent to approximately 2.5 mg/L (2.5 ppm) of Fe ions in solution.

This is achieved about by displacing the pH of the solution to 6.5-8.0, preferably to 7.0-8.0 and even more preferably to 7.0-7.5 by adding concentrated ammonium hydroxide $(NH_4OH)$ solution (approximately 24% by weight); this operation causes the formation of an insoluble ammonium oxyfluorotitanate $[(NH_4)_3TiOF_5)]$ which precipitates incorporating the residual iron salt $(NH_4)_3FeF_6$. The operation is performed within a reactor at a temperature of 50-70° C., preferably approximately 60° C., with stirring; the stirring speed is normally 40-90 rpm, preferably approximately 50 rpm; the quantity of $NH_4OH$ which has to be added is controlled by keeping the pH in the outflow from the vessel to a preferred value of 7.0-8.0, and even more preferably 7.5-8.0.

The dispersion is filtered, yielding an aqueous solution of the titanium salt $(NH_4)_2TiF_6$, further purified from compounds containing iron, and a sludge containing the titanium complex and the iron salt $(NH_4)_3FeF_6$.

The sludge may be dissolved again within a further vessel provided with stirring for acidification; this takes place with the addition of a concentrated $NH_4F$ and/or optionally $NH_4HF_2$ solution (approximately 40-50% by weight) to a pH of approximately 6.5-7.0; in this way the titanium salt becomes soluble again, forming $(NH_4)_2TiF_6$. The solution/dispersion so obtained is then recycled in addition to the outflow from the main reactor.

This solution/dispersion contains both the soluble titanium salt $(NH_4)_2TiF_6$ and the insoluble iron salt $(NH_4)_3FeF_6$ which has been incorporated by the ammonium oxyfluorotitanate as it precipitates out. This makes it possible to recover both metals completely without producing any waste.

The purified solution, which contains the titanium salt $(NH_4)_2TiF_6$, $NH_4F$ and water, is then subjected to further hydrolysis.

The further hydrolysis is performed in a reactor fitted with a stirrer (approximately 10 rpm), maintaining a temperature of 50-70° C., preferably approximately 60° C. The reaction takes place by raising the pH of the solution to very high values, preferably 9-11 and even more preferably approximately 10-11 (monitoring the outflow from the reactor); this result is obtained by adding a concentrated solution of ammonium hydroxide $NH_4OH$ (approximately 24% by weight); this ammonium hydroxide solution is preferably used in large excess compared to that which is required for the reaction.

The further hydrolysis brings about the precipitation of a mixture of hydrated titanium salts and oxides $(NH_4)_2TiOF_4$+$(NH_4)_3TiOF_5$+$TiO_2.n\ H_2O$ in the form of particles having dimensions of approximately 0.01 μm. As a consequence an aqueous solution of $NH_4F$ with a dispersed solid comprising salts which can be filtered out is produced in the hydrolysis reactor.

The dispersion thus obtained is then filtered through a filter having extremely fine meshes (2-3 nm, preferably approximately 2.5 nm).

The solution leaving the filter, which contains $NH_4F$, water, excess ammonia and traces of titanium salts, is preferably treated to obtain solid $NH_4HF_2$ so that it can be reused in the stage of reacting with the ilmenite.

In order to perform this operation, the solution is preferably heated to boiling in the presence of very slight negative pressure (10 to 60 mm of Hg) with the release of ammonia; the temperature is then raised to 150-170° C. and kept there for at least 60 minutes (still under negative pressure), preferably for 60-120 minutes, with consequent decomposition of the $NH_4F$ salt into $NH_4HF_2$ and ammonia, with the latter being removed. After this operation a solid salt is present in the bottom of the reactor and this is dissolved in water to yield a solution of 10% to 37% by weight, preferably approximately 30% by weight, having a pH of 5.5-5.7.

The sludge part leaving the filter, which normally has a mosiure content of between 10 and 20% by weight depending upon the filtering equipment, is subjected to a pyrohydrolysis process. In more detail, after drying to the point where water is removed, the sludge containing the titanium salts undergoes pyrohydrolysis at a maximum temperature of 500° C., preferably at a maximum temperature between 330 and 470° C. and even more preferably between 350 and 450° C., being kept at the maximum temperature for a period of 1-3 hours, preferably approximately 2 hours; this normally takes place in a furnace in an atmosphere of superheated steam; the maximum temperature is reached gradually, preferably with a gradient of 3-6° C./minute, even more preferably 5° C./minute.

The gaseous compounds extracted from the furnace containing $NH_3$, HF, $H_2O$ are normally cooled and absorbed in water to obtain a concentrated solution of $NH_4F$ and/or $NH_4HF_2$ which can easily be recycled and reused to charge the reactor. It is recommended that the gases should not be cooled below 200° C. before being absorbed in water, to prevent the formation of $NH_4F$ and/or $NH_4HF_2$ crystals with consequent obstruction of the tubing.

Under these conditions, if the metal is titanium, all the ammoniacal fluorine bonds are broken, yielding a powder product comprising just fluorine-doped $TiO_2$ particles, the characteristics of which are listed below:

Analysis by HR-TEM (High-Resolution Transmission Electron Microscopy) reveals the sub-micron morphology of the FT powders. In particular the particles are found to have a polydisperse size distribution, being present either as regular shapes with well-defined edges or as smaller-size irregular shapes. Measurement of the interplanar distances for both types of particles shows that nanocrystals of anatase having dimensions of less than 500 nm are present (see FIGS. 1 and 2).

Scanning electron microscope (SEM) analyses made using an acceleration voltage of 10 kV and a standard secondary electrons detector have revealed that some of the particles have aggregated to form globular masses while some have aggregated to form internally hollow octahedral structures having edges of variable length between 40 to 60 µm, preferably approximately 50 µm (see FIGS. 3 and 4).

Elementary analysis using SEM with energy dispersion microanalysis (SEM-EDS) has revealed a quantity by weight of fluorine (with respect to the total mass of the particles) of between 0.5 and 5% by weight, preferably between 1.0 and 4% by weight.

XPS (X-ray Photoelectron Spectroscopy) surface elementary analysis has revealed a quantity of fluoride of between 9% and 30% molar with respect to the titanium, which is approximately equivalent to a weight fraction of fluorine of between 1.5 and 9% by weight, preferably between 2.1 and 6.8% by weight. The latter values are slightly greater than those obtained using the scanning electron microscope (SEM), an indication that the crystalline structures which are richer in fluorine and other elements (nitrogen and hydroxy groups) are to be found on the surface.

Elementary analysis has revealed a quantity of nitrogen of between 0.2 and 8% by weight, preferably between 0.3 and 7.5%, even more preferably between 2.5 and 7%, and a quantity of hydrogen between 0.05 and 4% by weight, preferably between 0.08 and 3%, even more preferably between 1.5 and 2.5% (the percentages are to be understood as being relative to the total mass of the particles); the presence of hydrogen has been associated with the surface hydroxy groups, while the nitrogen has been associated with ammonium groups, $NH_4$, and nitrogen oxides, $NO_R$, above all on the surface.

Chemical analysis of the particles performed using ICP-AES has shown that they contain traces (<1% by weight) of Ca, Co, Fe, K, Mg, Nb, Ni, W, Si and Zn;

X diffraction (XRD) investigations have confirmed that the FT particles are made of a single crystalline phase—anatase, without amorphous traces or traces of the initial transition to rutile. No structural modification due the presence of the fluoride was noted from the XRD spectrum of the FT powders and it can therefore be assumed that this is only present on the surface of the FT particles.

From all the investigations it follows that the particles are nanocrystals of titanium dioxide containing fluorine, preferably anatase, said nanocrystals being characterised in that the fluorine is mainly present on their surfaces and that its concentration decreases gradually moving away from the surface, that is towards the centre of the crystal.

One aspect of the invention is therefore represented by the fact that the fluorine (or the fluorine atoms) is essentially present on the surface of the particles; in other words at least 80% of the fluorine, preferably at least 90%, is present in a surface layer of the particles, this surface layer having a mean thickness of between 0.3 and 20 nm, preferably between 0.6 and 10 nm.

The investigations performed also demonstrate that the fluorine atoms both form bridges between titanium atoms and are terminal.

Hydroxy groups as well as ammonium cations and nitrogen oxides are also present on the surfaces of the particles.

The "shell-core" structure of the particles, that is the surface location of the fluorine and the hydroxy groups, has a significant part to play for the purpose of using these in the production of inorganic/organic hybrid membranes and/or in the production of solid-state electrolytes.

The inorganic/organic hybrid membrane is prepared from a uniform dispersion in a suitable solvent which includes the proton-conducting material and the filler in the quantities established through a conventional solvent-casting process described for example in Liao et al., "Fabrication of porous biodegradable polymer scaffolds using a solvent merging/particulate leaching method", *Journal of Biomedical Materials Research* 59 (4): 676-81, March 2002, included here for reference. The hybrid membrane is obtained after the solvent has been removed and the resulting system has been suitably modelled. At this point the membrane may undergo a number of thermal, mechanical and chemical treatments to consolidate it and improve its mechanical and functional properties. The membrane is finally washed and suitably activated to remove any traces of solvent and other undesirable anionic and cationic contaminants and if possible improve its mechanical and functional properties further, thus giving rise to the final inorganic/organic hybrid membrane.

The solvent casting process mentioned may be performed from liquid suspensions or homogeneous liquid solutions at temperatures varying between 0 and 170° C., said suspensions and liquid solutions being preferably obtained by mechanical mixing and by the treatment of precursors and solvents with ultrasound; preferably ionomer polymers based on polytetrafluoroethylene sulphonates, polysulphone sulphonates, polyetherketone sulphonates, acidified polybenzimidazoles, polyalkyl siloxanes rendered functional with acid groups and aprotic polar organic solvents such as DMF are preferably used.

Alternatively the membranes according to this invention may be obtained by other conventional processes, for example by extruding mixtures of precursors at temperatures over 150° C.

The solid-state electrolyte may be prepared by reacting the aforesaid particles in the anhydrous state with an alkali or alkaline earth metal, preferably lithium, in the fused state. Said metal in the fused state is preferably used in excess with respect to the particles; preferably the metal is used in a quantity of between 1000 and 0.5 parts by weight to one part by weight of particles, even more preferably in quantities between 50 and 1 part by weight per one part by weight of particles.

The lithiation reaction of fluorine-doped titanium dioxide particles may be shown diagrammatically as follows.

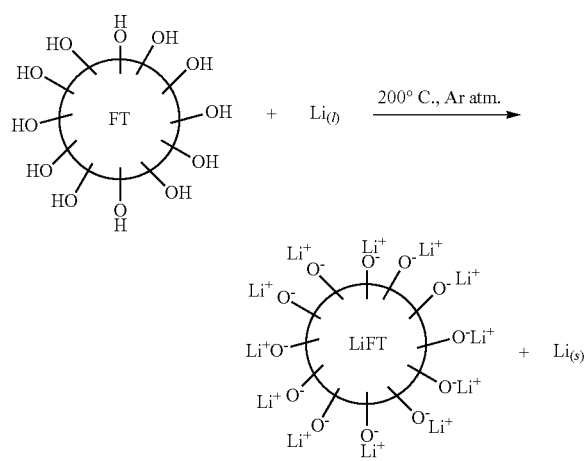

As will be seen, the reaction leads to the formation of particles having alkali or alkaline earth metal cations on its surface, in the case in point $Li^+$. The new compound will be indicated below as LiFT.

The following examples are illustrative and do not restrict the invention.

EXAMPLES

Example (a)

Preparation of Fluorine-Doped $TiO_2$ (FT)

7 liters of water, 3 kg of $NH_4HF_2$ salt and 1341 g of ilmenite sand sieved to a particle size of less than 200 microns were placed in a stirred reactor having a volume of approximately 10 liters. The mixture was then brought to boiling at atmospheric pressure, and kept there for approximately 1 hour. After this stage of reaction with the ore, 4 liters of solution were drawn off through the valve in the bottom of the reactor and then filtered. 1.5 liters of a concentrated 30% ammonia solution was added to the solution thus filtered containing the titanium and iron fluoride salts, thermostatted to 70° C., increasing its pH to 7.3. The white precipitate was separated out by filtration and a further 2 liters of a concentrated solution of 30% ammonia were added to the filtrate to obtain a pH of around 9.5. The white precipitate was separated out by filtration and subjected to the subsequent stage of pyrohydrolysis. Approximately 30 g of this wet intermediate (moisture content approximately 20%) was placed in an aluminium tube. The tube was inserted into a furnace chamber. It was then heated as follows: 4.7° C./min up to 450° C. and kept there for 2 hours. Slow cooling followed. Approximately 20 g/min of steam were fed to the tube during the entire test until it ceased to remain at high temperature. The final powder was yellow in appearance and not agglomerated. This comprised anatase doped with approximately 2.3% by weight of fluorine.

Example (b)

Membranes Containing Fluorine-Doped $TiO_2$

This example provides a detailed description of the preparation and investigation of some inorganic/organic hybrid membranes containing fluorine-doped $TiO_2$ according to the present invention. The mechanical properties of the membranes were studied by dynamic-mechanical analysis (DMA); the membranes were also used to build individual fuel cells tested under different operating conditions for reagent pressure, relative humidity and oxidising agent used.

Membrane Preparation

A quantity of 5% by weight Nafion™ emulsion was dried by evaporating the solvents. The quantities of solid obtained were dissolved in approximately 15 ml of dimethylformamide in the ratios shown in Table 1; the product was a mixture which was rendered homogeneous following treatment in a conventional ultrasound bath lasting 2 hours. The filler, comprising sub-micron particles of fluorine-doped $TiO_2$ obtained according to example (a) were added to the Nafion mixture, achieving the filler/Nafion ratio by weight shown in Table 1. The resulting suspension was carefully homogenised by treatment in an ultrasound bath for 5 hours and was then subjected to a conventional solvent-casting process in dry air to remove the solvent completely. The membrane obtained was: a) hot pressed at a temperature below 150° C.; b) repeatedly washed with hydrogen peroxide to remove any traces of organic solvent; c) repeatedly activated with a solution of sulphuric acid to expel cationic contaminants and activate the sulphone groups of the Nafion. The final inorganic/organic hybrid membrane was obtained by drying the product obtained in air.

TABLE 1

| Quantity of Nafion and filler used in membrane preparation | | | | |
|---|---|---|---|---|
| Membrane | Nominal % weight of filler | Mass of Nafion (mg) | Mass of filler (mg) | Effective % weight of filler |
| Nafion | 0 | 1040.4 | 0 | 0 |
| $TiO_2F$ 5% | 5 | 982.6 | 43.9 | 4.28 |
| $TiO_2F$ 10% | 10 | 936.4 | 89.7 | 8.74 |
| $TiO_2F$ 15% | 15 | 884.3 | 135.4 | 13.3 |

The filler used in the preparation of inorganic/organic hybrid membranes is indicated in Table 1 by the formula $TiO_2F$. Four membranes in all were prepared. Three of these were inorganic/organic hybrid membranes characterised by different percentages by weight of $TiO_2F$; the fourth membrane did not contain inorganic filler and was used as a reference. All the resulting membranes were of similar thickness, approximately 0.1 millimeters.

Dynamic-Mechanical Analyses

The membranes obtained were subjected to dynamic-mechanical analyses (DMA). FIG. 5 shows the change in the elastic modulus of the membranes as a function of temperature. It can be seen that all the inorganic/organic hybrid membranes are characterised by decidedly better mechanical properties than the pure Nafion membrane used as a reference. In particular, as shown in insert a) in FIG. 5, at 25° C. the elastic modulus of all the inorganic/organic hybrid membranes is almost twice that of the pure Nafion membrane. It can also be noted that while the 5% $TiO_2F$ membrane and the pure Nafion membrane undergo irreversible elongation at temperatures above approximately 120° C., the 10% $TiO_2F$ and 15% $TiO_2F$ membranes maintain their mechanical properties at quite high temperatures, up to and beyond 200° C. FIG. 6 shows the change in tan δ=viscous modulus/elastic modulus of the membranes in relation to temperature. The maximum for peak α decreases substantially as the quantity of filler included in the inorganic/organic hybrid membrane increases, as shown in insert a). This experimental evidence is indicative of how the relaxation α, which is responsible for the decline in the mechanical properties of pure Nafion at T>100° C., is strongly inhibited by the presence of the filler. As a consequence the inorganic/organic hybrid membranes described in this example may also be used at higher temperatures than pure Nafion, beyond 120-130° C., while continuing to maintain their mechanical properties.

Determination of the Performance of the Membranes in an Individual PEMFC

The membranes described in this example were used to manufacture membrane-electrode assemblies (MEA) which were then tested under operating conditions as individual PEMFC. The MEA were prepared using standard procedures. All the MEA used electrodes prepared from porous Teflon-coated carbon paper provided with microporous layers. Catalysts containing 20% by weight of platinum in the form of nanometric particles supported on activated carbon were used. The overall platinum load used for all the electrodes was 0.4 mg/cm². The active area of each electrode was approximately 4 cm². FIG. 7 shows the polarisation curves for the MEA assembled from the membranes described in this example. It can be seen how all the MEA assembled from inorganic/organic hybrid membranes have better performance characteristics than the MEA assembled using the pure Nafion membrane. The gradient of the polarisation curve of a PEMFC fed with hydrogen at a cell voltage of approximately 0.6 V is inversely correlated to the proton conductivity of the membrane used. In general, the steeper the slope, the poorer the proton conductivity of the material from which the membrane is made. It can therefore be deduced that under "ideal" conditions (high reagent pressure, P=5 bar, use of oxygen as an oxidising agent, 100% relative humidity and T=85° C.) all the inorganic/organic hybrid membranes have greater proton conductivity than the pure Nafion. This conclusion remains valid even if the MEA are subjected to a lower reagent pressure (P=2 bar, FIG. 8), and when the MEA are fed with air instead of pure oxygen as an oxidising agent. The better performance of the inorganic/organic hybrid membranes than pure Nafion membrane is also evidenced by the higher maximum power density which can be obtained from the MEA, which is shown in FIG. 9 and FIG. 10 for reagent pressures of 5 and 2 bar, respectively. All the MEA were also tested under relative humidity conditions of 75%, 50%, 25%, 12.5% and 5%, maintaining a reagent pressure of 2 bar. FIG. 11 shows the corresponding polarisation curves for the MEA assembled from pure Nafion membrane. FIG. 12, FIG. 13 and FIG. 14 show the similar polarisation curves for the MEA assembled from 5% $TiO_2F$, 10% $TiO_2F$ and 15% $TiO_2F$ membranes, respectively. One way of evaluating the effect of relative humidity on the performance of MEA is that of using, as a parameter, the maximum power density provided by the device under various conditions, as shown in FIG. 15. It can be seen how all the MEA have performances which worsen as the relative humidity of the reagents falls. However the MEA assembled using 10% $TiO_2F$ membrane according to this invention is less influenced by dehydration than that assembled from pure Nafion membrane, above all if fed with pure oxygen as the oxidising agent.

Example (c)

Solid-State Electrolyte

A quantity of FT obtained as in example (a) was rendered anhydrous under vacuum for 72 hours at 100° C. and $10^{-1}$ mbar. 2 g of FT were reacted with a large excess of fused lithium at 220° C. using an isomantle and mixing constantly. The reaction was performed in a crucible in an atmosphere of argon (oxygen and water<1 ppm). FT and fused lithium metal were reacted for 2 hours. During the course of the reaction it was noted that the fluorinated titanium dioxide changed its colour from straw yellow to blue, retaining its appearance as a powder. The product was copiously washed (total 700 ml) with ethanol, obtaining the final product known as LiFT. ICP-AES analyses revealed that the LiFT had the following composition Ti 33.8%, C 0.30%, N 0.37%, H 0.26% Li 1.34% and O 62.73% and SEM-EDS showed the fluorine content to be approximately 1.2% by weight.

BRIEF DESCRIPTION OF THE FIGURES

FIG. 8. Polarisation curves for MEA assembled from the membranes. The reagent pressure is 2 bar; the other operating conditions are the same as those shown in the description for FIG. 7.

FIG. 9. Maximum power density provided by MEA assembled from the membranes. Reagent pressure 5 bar, relative humidity of the reagents 100%. The remaining operating conditions are the same as those shown in the description for FIG. 7.

FIG. 10. Maximum power density provided by MEA assembled from the membranes. Reagent pressure 2 bar, relative humidity of the reagents 100%. The remaining operating conditions are the same as those shown in the description for FIG. 7.

FIG. 12. Polarisation curves for the MEA assembled from 5% $TiO_2F$ membrane with varying relative humidity of the reagents. Reagent pressure 2 bar; the other operating conditions are the same as those shown in the description for FIG. 7.

FIG. 14. Polarisation curves for the MEA assembled from 15% $TiO_2F$ membrane with varying relative humidity of the reagents. Reagent pressure 2 bar; the other operating conditions are the same as those shown in the description for FIG. 7.

Figure 1:
FIG. 1-2. HR-TEM (High-Resolution Transmission Electron Microscopy) analyses of fluorine-doped titanium dioxide particles.
Figure 2:
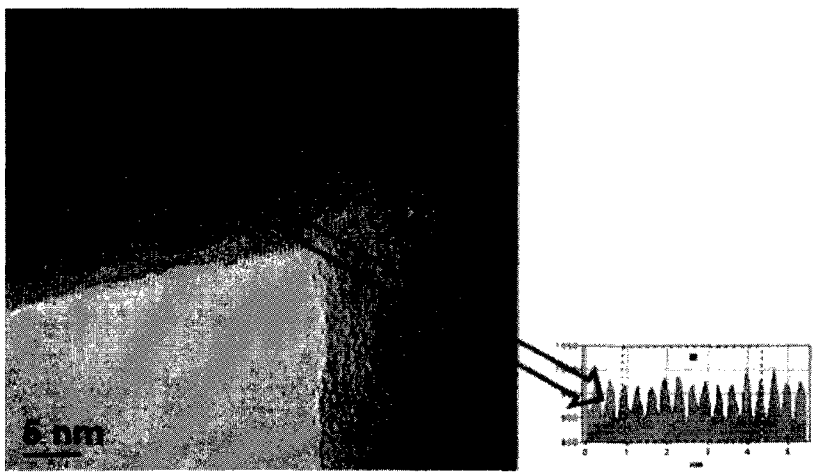
Figure 3:
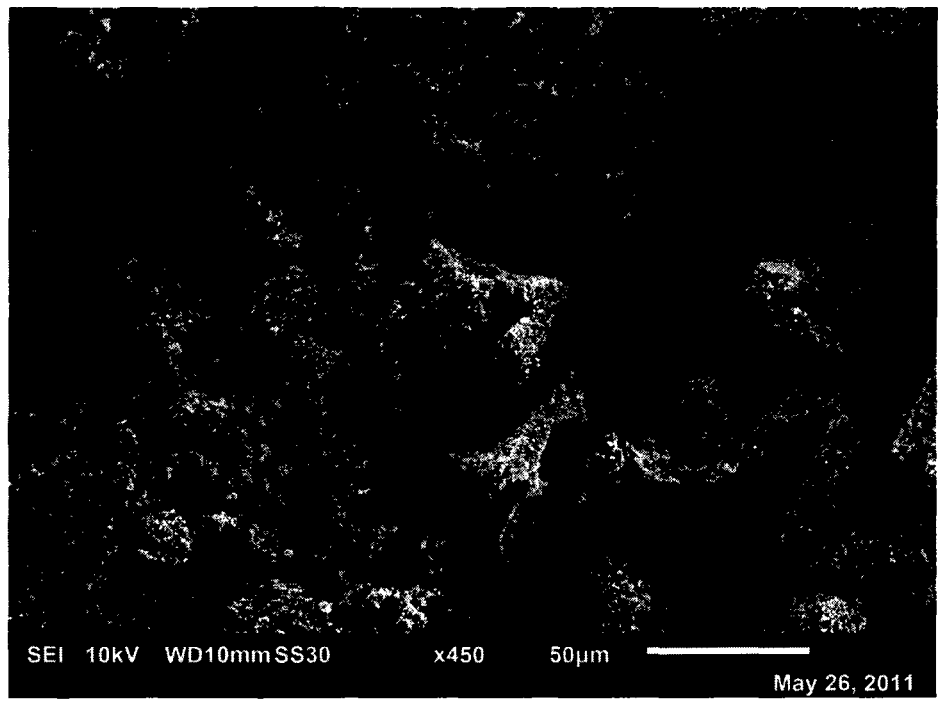
FIG. 3-4. Scanning electron microscope (SEM) analyses of fluorine-doped titanium dioxide particles.
Figure 4:
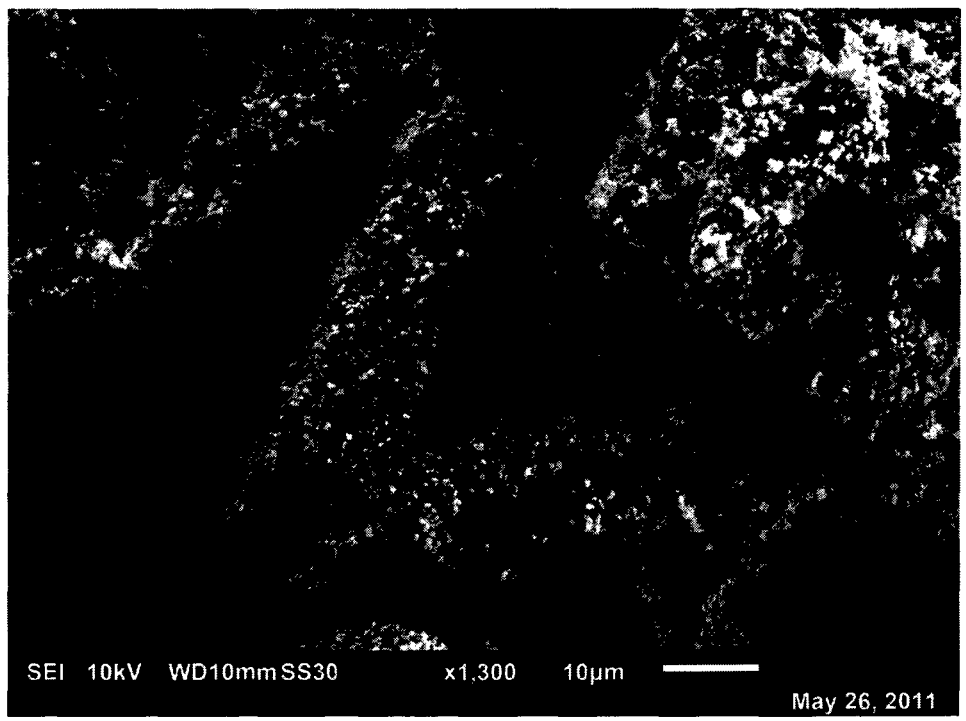
Figure 5:
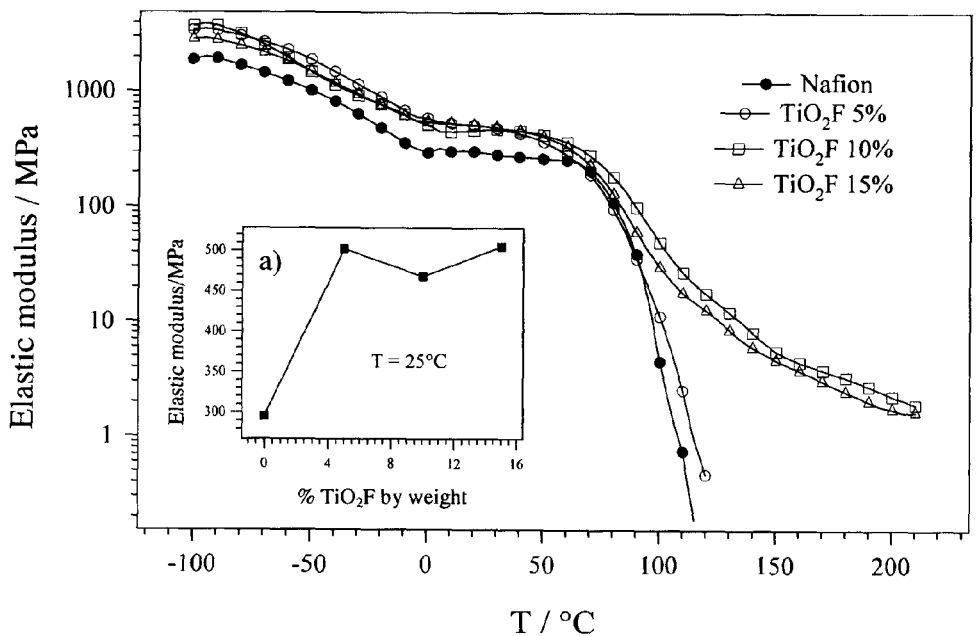
FIG. 5. Change in the elastic modulus of the membranes in relation to temperature. The values of the elastic modulus at 25° C. are shown in insert a).
Figure 6:
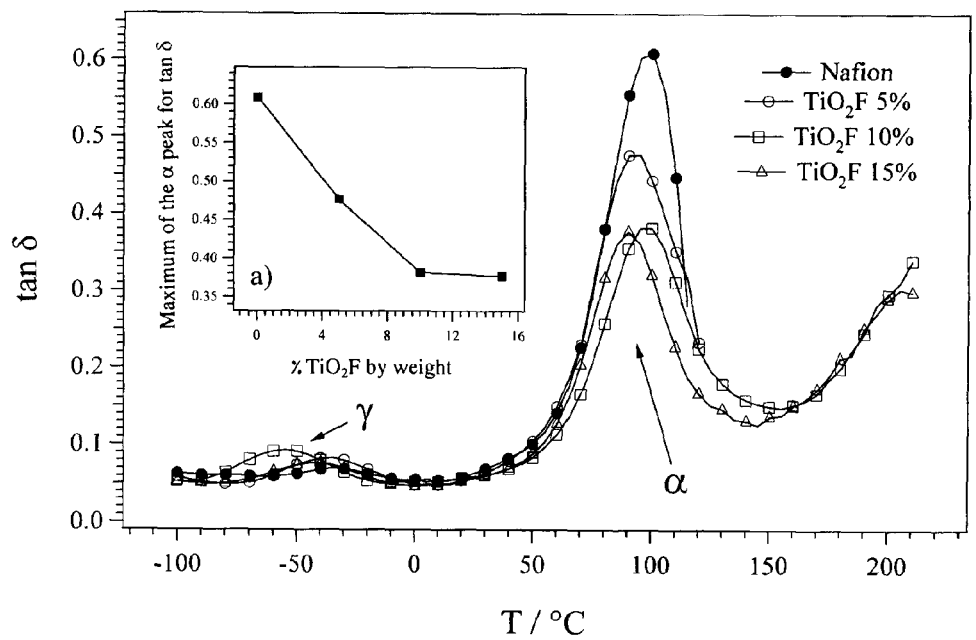
FIG. 6. Change in tan δ=viscous modulus/elastic modulus with temperature for the membranes. Insert a) shows the values of tan δ for the maximum peak α.
Figure 7:
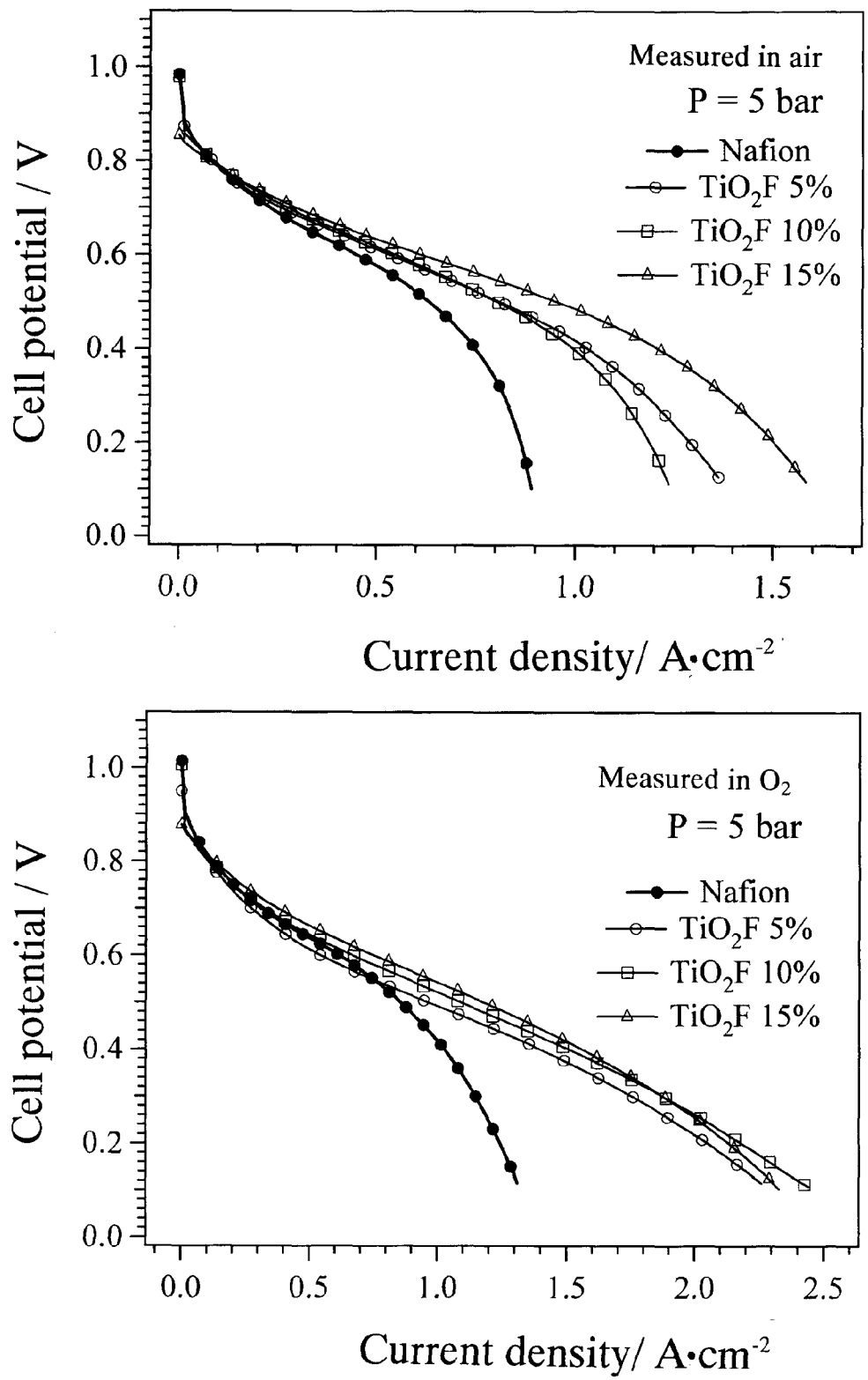
FIG. 7. Polarisation curves for MEA assembled from the membranes. The operating conditions are as follows: cell temperature 85° C.; temperature of the hydrogen flow and oxidising agent flow 85° C.; relative moisture content of the reagents 100%; flow of hydrogen: 800 sccm; oxidising agent used: air (top), pure oxygen (bottom); flow of oxidising agent: 1700 sccm (air), 500 sccm (pure oxygen); reagent pressure: 5 bar.
Figure 11:
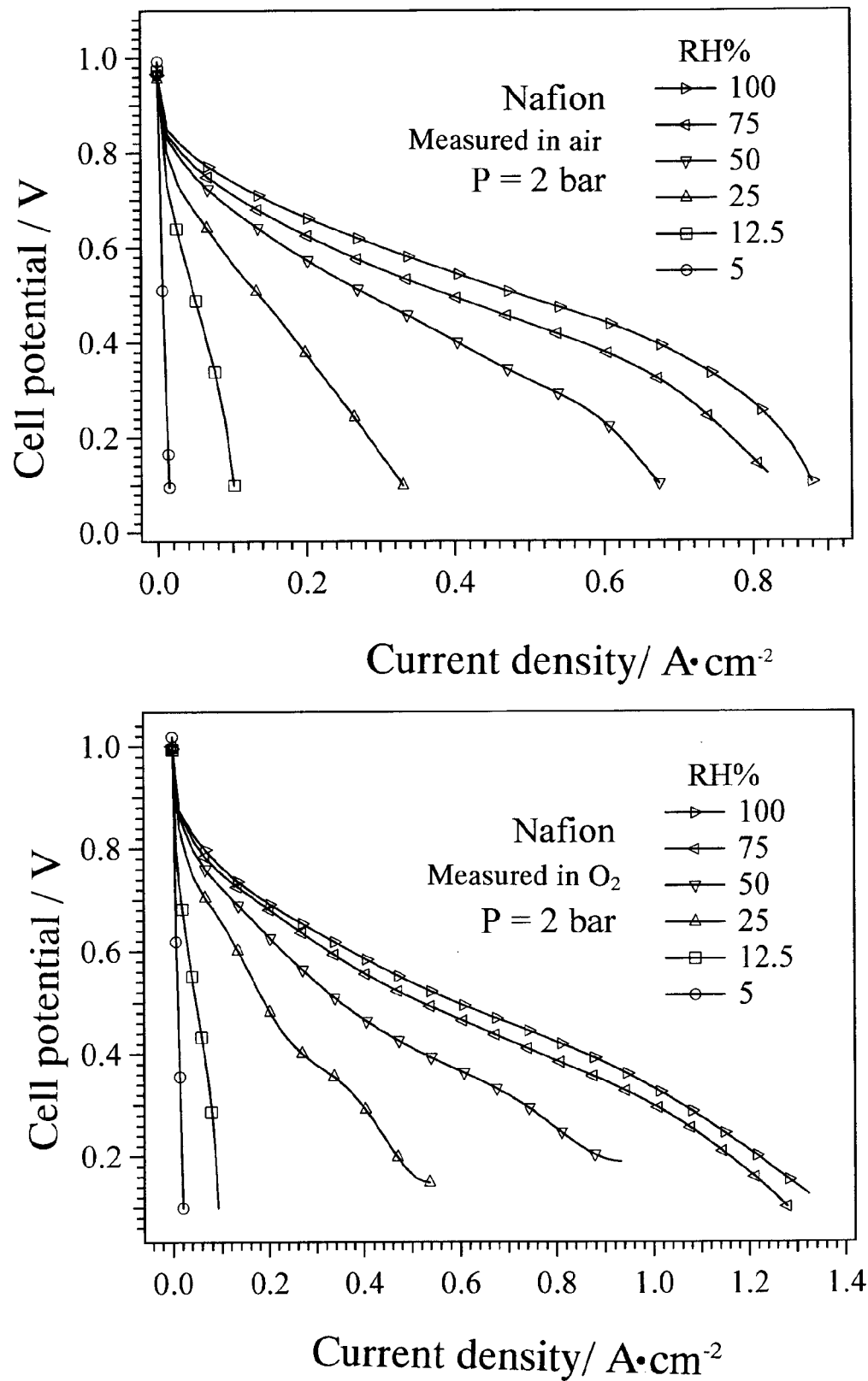
FIG. 11. Polarisation curves for the MEA assembled from the pure Nafion membrane with varying relative humidity of the reagents. Reagent pressure 2 bar; the other operating conditions are the same as those shown in the description for FIG. 7.
Figure 13:
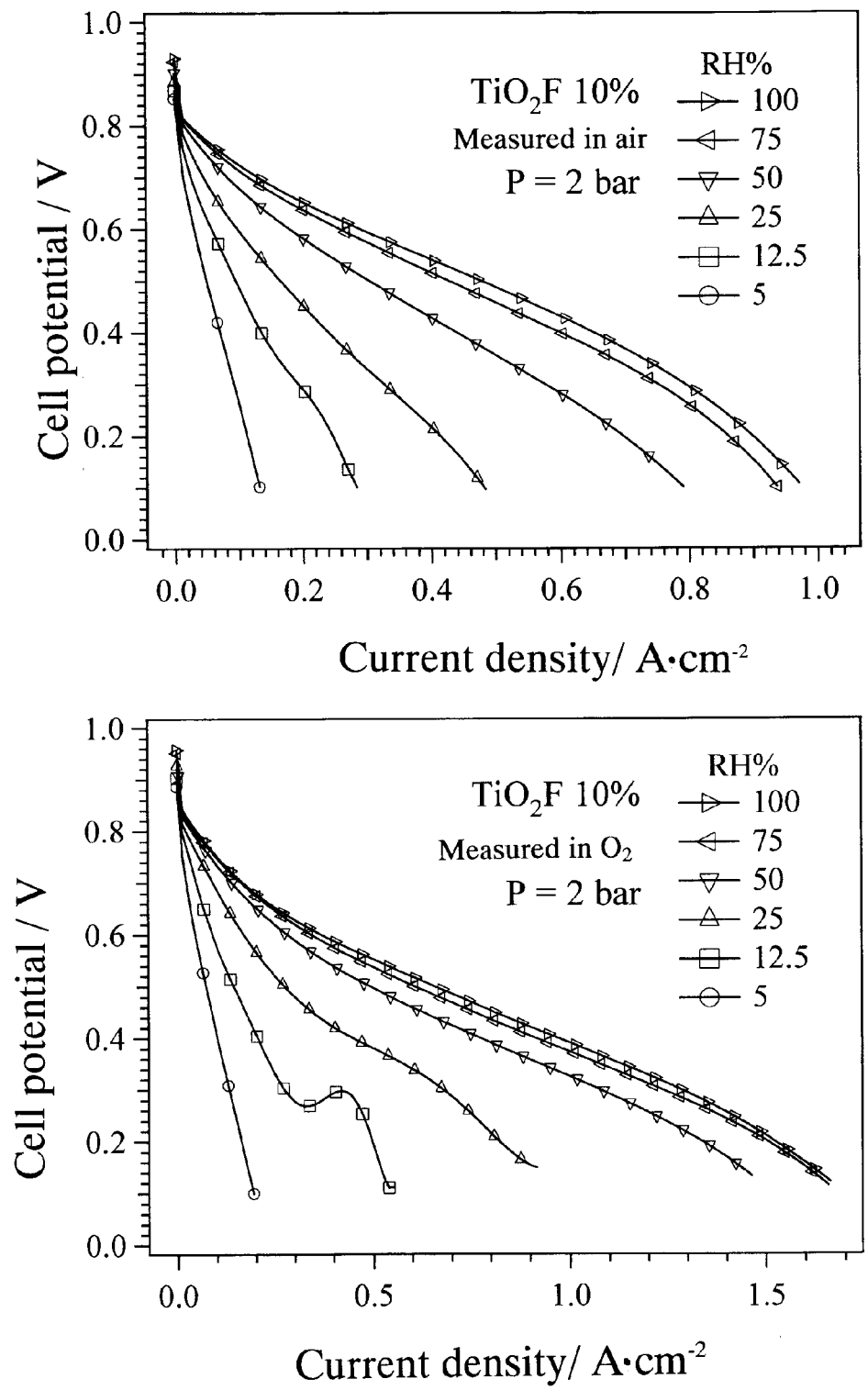
FIG. 13. Polarisation curves for the MEA assembled from 10% $TiO_2F$ membrane with varying relative humidity of the reagents. Reagent pressure 2 bar; the other operating conditions are the same as those shown in the description for FIG. 7.
Figure 15:
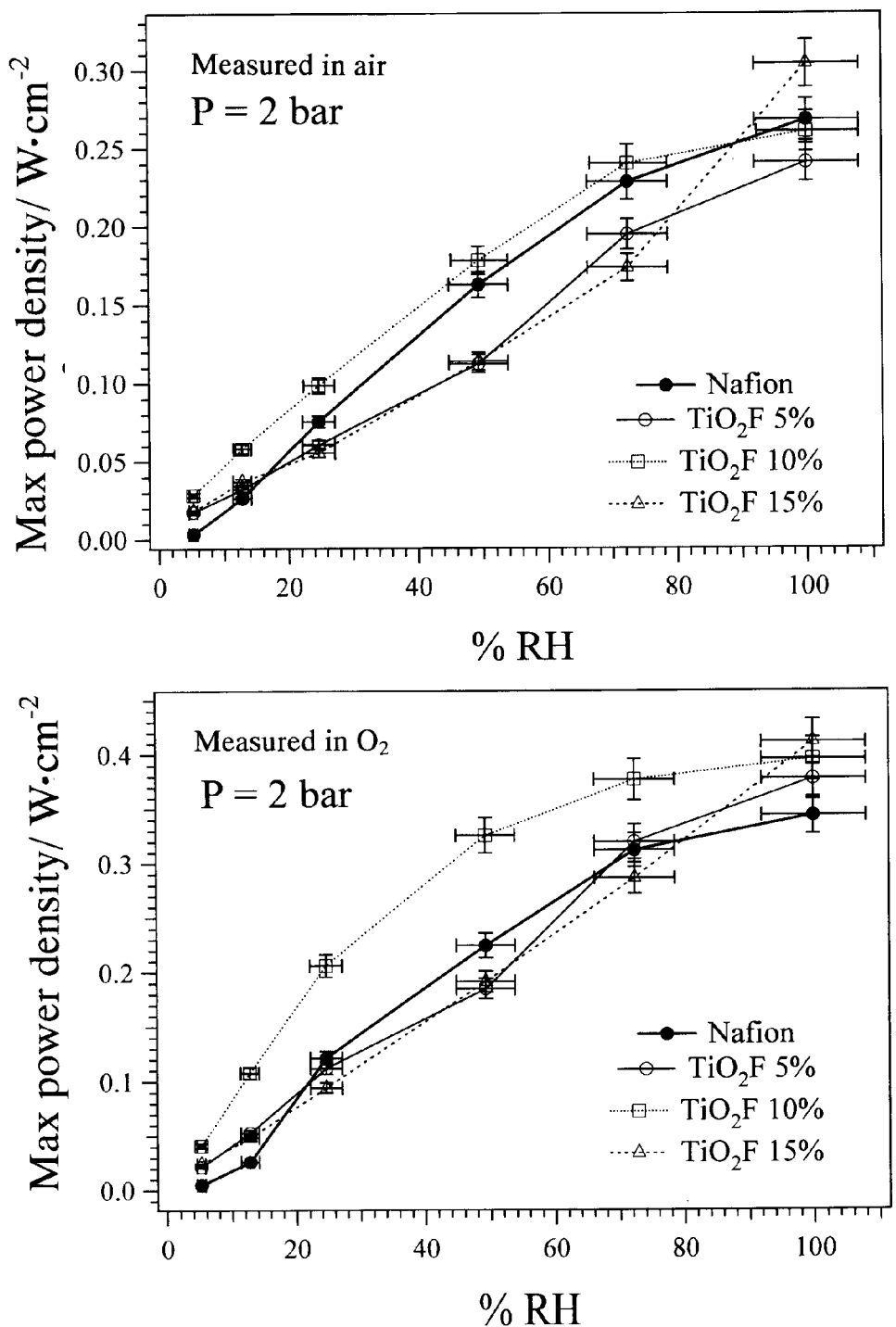
FIG. 15. Change in the maximum power density provided by the various MEA in relation to relative humidity at a reagent pressure of 2 bar. The other operating conditions are the same as those shown in the description for FIG. 7.

The invention claimed is:

1. Crystalline titanium dioxide particles having an average particle size of less than 500 nm and having a fluorine content of between 0.5 and 5% by weight, wherein the crystalline titanium dioxide particles include hydroxy groups, ammonium cations and nitrogen oxides.

2. The crystalline titanium dioxide particles of claim 1 wherein the particles have a fluorine content of between 1.0 and 4% by weight.

3. The crystalline titanium dioxide particles of claim 1 wherein the particles have an average particle size of between 10 and 500 nm.

4. The crystalline titanium dioxide particles of claim 1 wherein the particles have a nitrogen content of between 0.2 and 8% by weight.

5. The crystalline titanium dioxide particles of claim 4 wherein the particles have a nitrogen content of between 2.5 and 7% by weight.

6. The crystalline titanium dioxide particles of claim 1 wherein the particles have a hydrogen content of between 0.05 and 4% by weight.

7. The crystalline titanium dioxide particles of claim 1 wherein the particles have at least part of the fluorine content present in a surface layer of the particles.

8. The crystalline titanium dioxide particles of claim 7 wherein at least 80% of the fluorine content is present in a surface layer of the particles.

9. The crystalline titanium dioxide particles of claim 7 wherein the surface layer has a mean thickness of between 0.3 and 20 nm.

10. The crystalline titanium dioxide particles of claim 1 wherein the particles have hydroxy groups present in a surface layer of the particles.

11. The crystalline titanium dioxide particles of claim 1 wherein the particles are in an anatase form.

12. A process for producing crystalline titanium dioxide containing fluorine atoms, comprising the steps of:
(a) reacting a titanium ore with a $NH_4HF_2$ aqueous solution to obtain an aqueous dispersion;
(b) filtering the aqueous dispersion to separate the aqueous dispersion into a solid residue and an aqueous solution containing titanium salts;
(c) subjecting the aqueous solution to hydrolysis, the hydrolysis comprising a first stage at a pH between 6.5-8.0 and a second stage at a pH between 9.0-11.0;
(d) filtering the aqueous solution to separate the aqueous solution into an additional solid residue and a filtrate;
(e) subjecting the additional solid residue to pyrohydrolysis at a maximum temperature of around 500° C.; and
(f) obtaining crystalline titanium dioxide containing fluorine atoms from the pyrohydrolysis.

13. The process according to claim 12 wherein the step (a) of reacting a titanium ore with a $NH_4HF_2$ aqueous solution is performed at 100-110° C.

14. The process according to claim 12 wherein the step (a) of reacting a titanium ore with a $NH_4HF_2$ aqueous solution is performed for a period of time between 40 and 80 minutes.

15. The process according to claim 12 wherein the step (a) of reacting a titanium ore with a $NH_4HF_2$ aqueous solution is performed at a pressure of approximately 1-2 bar.

16. The process according to claim 12 wherein the step (a) of reacting a titanium ore with a $NH_4HF_2$ aqueous solution is performed at a pH of approximately 6.5-7.0.

17. The process according to claim 12 wherein the $NH_4HF_2$ aqueous solution has a concentration of between 10% and 37% by weight.

18. The process according to claim 12 wherein the step (c) of subjecting the aqueous solution to hydrolysis includes adding a solution of ammonium hydroxide to the aqueous solution.

19. The process according to claim 12 wherein the step (e) of subjecting the additional solid residue to pyrohydrolysis includes subjecting the additional solid residue to pyrohydrolysis at a temperature of between 330-470° C.

20. The process according to claim 12 wherein the step (e) of subjecting the additional solid residue to pyrohydrolysis includes subjecting the additional solid residue to pyrohydrolysis for a period of time between 2-6 hours.

21. The process according to claim 12 wherein the step (b) of subjecting the solid residue to pyrohydrolysis includes subjecting the solid residue to pyrohydrolysis at a maximum temperature of 450° C. for a period of time between 2-4 hours.

22. The process according to claim 12 further comprising a step (f) of heating the filtrate of step (d) to a temperature of between 150-170° C. for a period of time of between 0.5 and 2 hours to obtain $NH_4HF_2$.

23. Titanium dioxide particles obtained by the process of claim 12.

24. The process according to claim 12 wherein the titanium ore is a titanium ore containing iron.

* * * * *